United States Patent [19]
Louie

[11] 3,963,519
[45] June 15, 1976

[54] METAL/AIR CELL
[75] Inventor: Hong Po Louie, Brooklyn, N.Y.
[73] Assignee: Leesona Corporation, Warwick, R.I.
[22] Filed: Aug. 3, 1971
[21] Appl. No.: 168,571

Related U.S. Application Data
[63] Continuation-in-part of Ser. No. 735,913, June 10, 1968, abandoned.

[52] U.S. Cl. ............................................. 136/86 A
[51] Int. Cl.² ........................................ H01M 12/06
[58] Field of Search ................. 136/86, 13, 14, 175, 136/136, 86 A

[56] References Cited
UNITED STATES PATENTS

| | | | |
|---|---|---|---|
| 2,597,116 | 5/1952 | Marsal et al. | 136/86 A UX |
| 2,641,623 | 6/1953 | Winckler et al. | 136/86 A UX |
| 2,935,547 | 5/1960 | Kordesch | 136/86 R |
| 3,219,486 | 11/1965 | Gumucio | 136/86 A |
| 3,259,523 | 7/1966 | Faris, Jr. et al. | 136/86 R |
| 3,293,080 | 12/1966 | Gruber et al. | 136/86 R |
| 3,316,126 | 4/1967 | LeDuc | 136/86 R |
| 3,335,031 | 8/1967 | Kordesch | 136/30 X |
| 3,378,406 | 4/1968 | Rosansky | 136/86 A |
| 3,457,115 | 7/1969 | Kent | 136/86 A |

FOREIGN PATENTS OR APPLICATIONS
393,332   10/1908   France .............................. 136/86 A
813,408   7/1956   United Kingdom ................ 136/30

OTHER PUBLICATIONS
Adams et al., "Fuel Cells", Graduate School of Bus. Adm. Harvard U., 10/1960 pp. 3, 4, 75, 76.

*Primary Examiner*—Allen B. Curtis
*Attorney, Agent, or Firm*—A. W. Breiner

[57] ABSTRACT

Primary and secondary lightweight "AA," "C," "D," and the like metal/air cells comprising an anode, a cathode, and an electrolyte are described in which the anode comprises a consumable porous metal and the cathode comprises a hydrophobic member in contact at one surface with an electrocatalyst. The aforesaid components of the cell are retained in a substantially rigid protective shield and spaced therefrom permitting access of air to the cathode over substantially the entire cathode surface area. The structural elements which include the protective shield spacers to space the shield from the cathode comprise lightweight materials such as lightweight metals or a thermosetting or thermoplastic resin or the like. The electrolyte can be a solution or paste of an ion-conductive material or a water-activatable solid, such as "dry" potassium hydroxide adhering to or absorbed in the anode and/or cathode and/or a hydrophilic separator between the anode and cathode.

18 Claims, 5 Drawing Figures

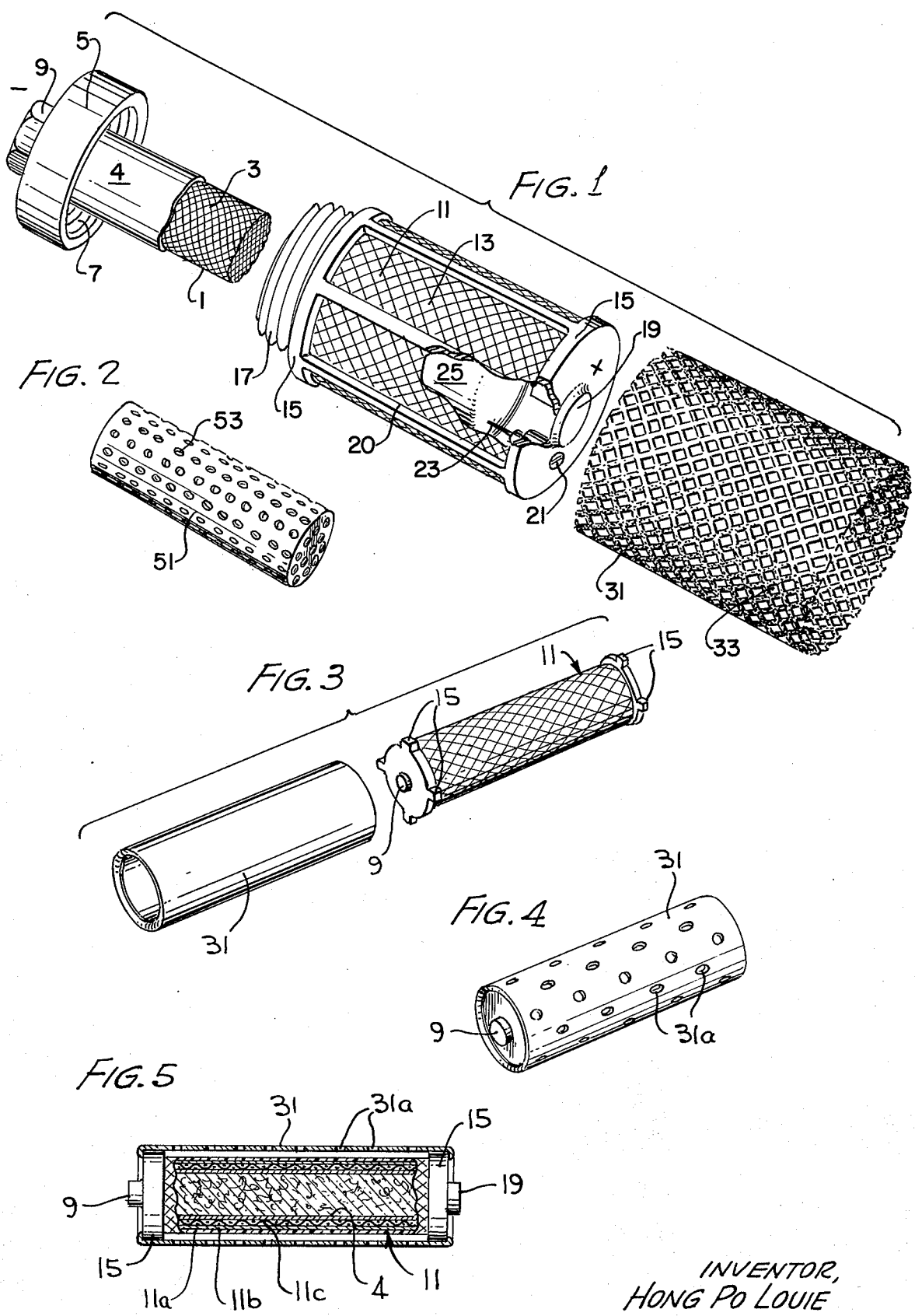

METAL/AIR CELL

This is a continuation-in-part application of co-pending application U.S. Ser. No. 735,913 filed June 10, 1968 now abandoned.

FIELD OF INVENTION

This invention relates to primary and secondary metal/air cells. More particularly, this invention is directed to metal/air cells comprising a consumable metal anode, an electrolyte, and an air-depolarized cathode comprising a hydrophobic member in contact with an electrocatalyst, the cell preferably having the configuration of conventional AA, C, and D cells.

DESCRIPTION OF THE PRIOR ART

Cells and batteries employing an air-depolarized cathode, i.e., a catalytic surface upon which oxygen in the air is reduced to oxide ions, hydroxide ions, or the like, in the presence of an electrolyte; are known in the prior art. Such cells employ an active metal as the anode, e.g., zinc. The best known of these prior art cells employ a carbon or activated carbon cathode. These cells will theoretically produce an EMF of up to 1.46 volts, but are heavy due primarily to the use of heavy carbon cathodes, and are incapable of meeting high current drain requirements for any substantial period to time. Generally speaking, they are primary cells and when the zinc anode has been consumed, the entire cell must be replaced. These cells are not suitable for construction in the conventional AA, C, and D cell designs.

Recently, cells have been developed employing light, highly efficient air-depolarized cathodes comprising a metal electrocatalyst adjacent to a hydrophobic polymer member. These prior art metal/air batteries, even with lightweight air cathodes, are disposed within relatively heavy frames, casings, housing, or the like, and are normally "activated" by adding electrolyte, to maintain shelf life, shortly before use. Such cells, therefore, have been considered to be generally unsuitable for fabrication in the so-called C, D, and AA cell configurations applicable in many applications where light weight is essential, e.g., portable communications equipment, flashlights, battery-powered toys, and the like. In such applications, the metal/air battery is not commercially competitive with the readily available manganese dioxide depolarized primary cells and the like in terms of convenience, cost, weight, and shelf life.

OBJECTS OF THE INVENTION

Accordingly, it is an object of this invention to provide a metal/air cell capable of fabrication in the conventional AA, C, and D cell designs.

It is another object of this invention to provide a metal/air cell having a lightweight and pressure deformable, air exposed cathode, with means for protecting said exposed cathode without substantially inhibiting air access to said cathode.

It is another object of this invention to provide a water-activated metal/air cell of simple construction.

It is another object of this invention to provide a mechanically rechargeable cell having the conventional AA, C, and D cell design.

It is another object of this invention to provide a metal/air cell wherein all electrically non-conductive structural elements or members comprise inexpensive, lightweight materials.

Still another object of this invention is to provide a metal/air cell of simple, lightweight construction which, while permitting air to contact the cathode and the electrolyte, is nevertheless liquid-tight such that loss of liquid electrolyte from the interior of the cell is prevented.

GENERAL DESCRIPTION OF THE INVENTION

The aforesaid and other objects of this invention are achieved by means of a metal/air battery structure comprising a pressure-deformable cathode member composed of a polymer member having an electrocatalyst on its inner surface spaced from a consumable metal anode with an ion-conductive electrolyte. The aforesaid polymer member is exposed over substantially its entire surface area to air and is protected by means of a protective shield spaced from said cathode. Preferably, the cathode is concentric in design and the porous metal anode is also concentric with a smaller transverse cross-section than the cathode and is retained within the cathode. Preferably, the anode is attached to or integral with a closure or sealing means at its upper end, the closure means being adapted to form a liquid-tight seal with the cathode. The electrolyte which separates the anode and the cathode can be a liquid, such as an aqueous solution of KOH, or distributed as a dry or anhydrous material in the anode and cathode and/or a hydrophilic material separating the anode and cathode. If a liquid electrolyte is used it preferably will be retained in the interior of the cell inside of a water-tight reservoir from which it may be released from outside the cell by an opening means such as a puncturing device or a tear strip. If a dry or anhydrous material is used, water for "activating" the cell preferably will be contained in the interior of the cell inside of a water-tight reservoir for release by an opening means such as a puncturing device or a tear strip. The outer protective shield or cover, preferably provided with ventilation means, is positioned away from the cathode structure to permit air access to the cathode.

The standard C, D, AA, and the like cells referred to hereinbefore are in the form of a cylinder, and this particular structure has the advantage of rendering the metal/air cells of this invention compatible in shape with battery compartments on existing battery-powered equipment. A rectangular parallelpiped shape is also desirable, since some of the larger commercial C and D type cells have this shape. A further advantage of both the cylindrical and rectangular parallelpiped shape is that the positive and negative terminals may protrude from the upper and/or lower ends, as is customary in the design of standard AA, C, and D cells.

The anodes which are to be used herein can be any conventional electro-conductor employed in a metal/air or metal/oxygen cell. It is only essential that the material selected be chemically reactive with a compatible electrolyte and be more electro-positive than oxygen. Such materials include lead, zinc, iron, cadmium, aluminum, and magnesium. From the standpoint of cost, capacity, and convenience, porous zinc is the preferred anode material. Although a porous anode is preferred, a solid metal sheet is operable.

Structurally speaking, the anode of this invention preferably comprises a porous metal cylinder integral with, or attachable to, a closure or sealing means comprising an insulating cap and a current collector terminal protruding therethrough and electrically connected to the porous metal cylinder. Alternatively, the anode can include a fine mesh enclosure filled with reactive metal powder. The anode can have impregnated therein an aqueous electrolyte or an anhydrous electrolyte material such as an alkali metal hydroxide or mixtures of alkali metal hydroxides. In the event an anhydrous electrolyte material is used, the cell will be activated by releasing water. Other electrolyte materials such as acid or basic anhydrides or hydrolyzable salts may be used, e.g., alkali metal oxides and salts of weak acids, ammonium salts of strong acids, oxides of nonmetals such as phosphorous and the like; but alkali metal hydroxides are preferred. The aforesaid closure means preferably comprises a lightweight electrically non-conductive material such as a synthetic resin, e.g., a polyalkylene or the like. The closure means is preferably designed to threadedly or frictionally engage the outer casing or spacer elements.

The cathode of this invention is preferably an electrically conductive porous support or current collector coated with, impregnated with, or otherwise in contact with a catalytic metal or a catalytic metal in admixture with a hydrophobic polymer such as a polyhaloalkylene resin. The preferred cathode structure comprises an outer, hydrophobic, gas-permeable face comprising a polymeric member of a polyhaloalkylene; an inner catalytic face or layer comprising a catalytic layer of a metal, metal oxide, or metal alloy of Group VIII, Group IB, or Group VB, Group VIB, or Group VIIB of the Periodic Table which can be mixed with particles or fibers of one of the above hydrophobic polymers; and a porous supporting and/or current-collecting element comprising any metal resistant to attack by the electrolyte. In the case of the catalytic metal, Groups VII and IB are preferred. The corrosion-resistant metal current-collecting element can comprise the metals of the second and third triads of Group VIII, nickel, cobalt, silver, gold, various ferrous alloys, titanium, hafnium, zirconium, chromium, alloys of these and the like.

The method of impregnating a cathode, anode, or separator material with an anyhydrous electrolyte material capable of water-activation is disclosed in the pending U.S. Ser. No. 702,658 filed Feb. 2, 1968, now U.S. Pat. No. 3,592,693.

The spacing element for spacing the protective shield from the cathode to permit air access over substantially the entire cathode surface area preferably is a lightweight material which can be integral with the cathode or constructed and arranged in any manner that will provide support for the cathode, i.e., to prevent bowing of the cathode away from the anode and, together with the anode and cathode, provide an electrolyte-tight seal between the anode and cathode. These spacers can be integral with the electrical terminals and may also contain means or access for means for puncturing, tearing, or otherwise opening a water or electrolyte reservoir disposed within the cathode. The water reservoir is preferably a flexible, sealed bag comprising a flexible, synthetic resinous material, e.g., a polyalkylene resin. In one embodiment, the bag is integral with a tear strip or string which ruptures it and releases the water when pulled. The use of the water or electrolyte reservoir is a non-essential but a preferred feature of this invention since it greatly simplifies the internal construction details of the invention while prolonging the shelf life of the cell since prior to rupturing the bag with the tear strip or puncturing means, the cell is not activated.

Alternatively, if the water reservoir feature is not used, a conventional paste or liquid electrolyte can be used. It is also possible to add a dried electrolyte material to a cell in which the anode and cathode are already in contact with pure water. However, this method of activation is somewhat less advantageous than the water reservoir method discussed above.

The metal/air cell is provided with a protective shield which may comprise metal, plastic, or the like. This outer or protective shield adds structural strength to the cell and protection of the cathode while permitting the ingress of air to the cathode over substantially its entire surface area.

It will be seen from the above description and the description of the drawing which follows that the present invention has overcome the problems of the prior art by providing a structure in which heavy frames, casings, and other supporting and sealing members are unnecessary, yet in which there is no loss of structural strength, no electrolyte leakage, and no warping or bowing of electrode elements and the like. Likewise, heavy pastes containing inactive fillers such as clay are unnecessary. Accordingly, the high watt-hour per pound characteristics of the metal/air cell are realized and exploited to a degree not previously obtained in the art. Unlike prior art metal/air cells, the construction details providing ingress of air and retention of electrolyte are both highly effective and extremely simple. For example, the entire anode assembly, including negative terminal and closure means, is so simple that the active part of the anode may be easily removed and replaced, thus permitting an instantaneous method of recharging the metal/air cell. Similarly, a replaceable metal anode impregnated with anhydrous electrolyte material and a rupturable water reservoir in the interior of the cell make for an extremely simple method of introducing or replenishing the electrolyte.

A more complete understanding of this invention can be obtained by referring to the drawings, in which:

FIG. 1 is an exploded, perspective view of a preferred embodiment of a metal/air cell made according to this invention;

FIG. 2 is a perspective view of an alternative form of cylindrical, porous metallic element for use as the anode of the cell of FIG. 1;

FIG. 3 is an exploded, perspective view of an alternative cell design;

FIG. 4 is a perspective view of still another embodiment; and

FIG. 5 is a cross-sectional view along lines 5—5 of FIG. 4

Turning now to FIG. 1, the exploded perspective view permits the anode 1 and accompanying structural elements, the cathode 11 and accompanying structural elements, and the outer or protective shield 31 to be considered separately. Spacer element or casing 15 and the cathode 11 are partially cut away to reveal the water reservoir 25 and puncturing means 23. Considering first the anode assembly, it will be seen that the anode 1 comprises a cylindrical metallic screen, i.e., gauze or mesh filled with active metal particles. The spaces in the mesh 3 permit good contact between the electrolyte and the anode which can be a liquid or, alternatively, the anode can include an anhydrous or dry electrolyte material which is activated upon contact with water. A separator material, 4, circumscribes the anode. This material can be any suitable hydrophilic material such as Visking, a co-polymer of vinyl chloride, and acrylonitrile, or the like. A closure means comprising a cap 5 is attached at the upper end, and an external terminal 9 protruding through the cap is electrically connected to the anode 1. The inside of the cap 5 is threaded and the female threads 7 form a liquid-tight seal with the male threads 17 of the spacer 15.

The cathode 11 as shown comprises a cylindrical hydrophobic polymer member 11a in contact on its inner surface with a catalytic metal 11b such as a metal of Groups VIII or IB of the Periodic Table, mixtures of alloys thereof. In the embodiment shown, a conductive screen 11c is adjacent to the catalyst layer. It is seen from the outside as a result of the thinness of the polymer member. Further, in the embodiment shown, the cathode 11 is bonded to spacer 15 to form a liquid-tight seal as a result of the hydrophobic, gas-permeable member which can be a polymer such as a polytetrafluoroethylene. Spacer 15 comprises a lightweight synthetic resin such as polyethylene. An external positive terminal 19 protrudes through the case 15 and is electrically connected to the cathode 11.

In the embodiment shown, the call is activated by rupturing, in this case puncturing, a thin, flexible water reservoir 25. This reservoir is preferably a hydrophobic plastic membrane. The puncturing means is a needle 23 attached to a threaded member which protrudes through the outer case 15 and has a slotted head 21 which, when turned, advances the needle into the bag 15 and punctures it, releasing the water or electrolyte solution. The water or electrolyte floods the interior of the cell and, in the case of water, dissolves the dried electrolyte material, e.g., a powdered alkali metal hydroxide, retained in the anode.

Additional structural strength and protection is provided by an outer or protective shield 31 comprising metal or plastic. The shield 31, as shown, is gauze-like in structure, and the spaces 33 in this structure permit ingress of air to the cathode 11. Alternatively, the shield can be solid and since it is positioned away from the cathode by spacer 15, air access is permitted through the end or ends of the shield as seen more clearly from the embodiment of FIG. 3 which will be described more fully hereinafter.

FIG. 2 shows an alternative form of cylindrical metal anode structure 51. It can be seen that the plurality of holes 53 in the anode 51 provide a large surface area available for reaction. As in FIG. 1, the anode can be impregnated with an electrolyte material capable of water-activation, e.g., a solid, anhydrous alkali metal hydroxide.

FIGS. 3, 4 and 5 disclose embodiments of the invention which are more closely related to conventional AA, C, or D cells and do not utilize electrolyte activating means for readying the cell for use.

The cell of FIG. 3 discloses comprising spacer elements 15 at either end of the cell which, together with the cathode 11 and closure means, provide an electrolyte-tight cell between the anode and cathode and electrical contact means. Outer shield 31 fits over the cell and is spaced from the cathode by means of the spacer element 15, the outer periphery of which is notched to permit air access into the cathode.

FIG. 4 is an embodiment substantially similar to FIG. 3 except in this instance the outer or protective shield 15 is integral with the closure means of the cell with air access being permitted to the cathode 11 through holes or openings 31a.

FIG. 5 is a cross-sectional view of the cell of FIG. 4 and depicts the structural relationship of the components of the cell. It is seen that the pressure-deformable cathode 11 which is made up of the hydrophobic polymer 11a, catalyst layer 11b, and conductive metal grid 11c is spaced from protective shield 31 by means of spacer elements 15 at either end of the cell. The anode 1 comprises a pastelike gel of potassium hydroxide electrolyte and powdered zinc. A porous hydrophilic separator 4 electrically separates the anode material from the cathode. The cathode is in electrical contact with terminal 19 and the anode material is in direct contact with terminal 9.

Although the embodiments shown herein closely resemble the standard AA, C, and D cells in external design characteristics, the cells of this invention are capable of wider application than such AA, C, and D cells and are generally superior in performance, particularly with regard to their power per weight ratio. The person skilled in the art will appreciate that, while particular attention has been paid throughout this description to the use of lightweight plastic materials in the spacer elements, outer shield, closure means, and the like, other materials such as metals and the like will function equally well. Although an active metal anode and a cathode comprising a catalytic membrane backed by a gas-permeable film are preferred, it will also be recognized that other anode and cathode structures can be employed. Furthermore, the anode and cathode structures need not be cylindrical in shape but may be some other hollow and porous configuration. It is also possible to dispose the cathode within the anode instead of vice versa. Many variations are also within the skill of the art with respect to the liquid-tight seal between the closure means and spacer, e.g., a tongue-in-groove seal, a ball and spigot arrangement, or the like. Additional members, such as sealing or insulating members, can be employed in the structure to further tighten the seal between the spacer and the closure means and to provide electrical insulation between the anode and cathode. Furthermore, the uses of the metal-/air cell of this invention are by no means limited to portable communications equipment, lighting equipment, battery-powered toys, and the like. Generally, any requirement for electrical energy presently met by a primary or secondary electrochemical cell or a plurality of such cells can also be met by the cells of this invention.

In short, many variations and modifications of this invention are possible without departing from its basic spirit and scope. The true scope of the invention is to be determined from the claims which follow.

It is claimed:

1. A unitary, compact, and completely self-contained cylinder-like metal/air cell of the flashlight type comprising a consumable metal anode, a pressure deformable cathode having a gas-permeable electrolyte impermeable outer face comprising a hydrophobic polymer and an electrocatalytic inner face, said electrocatalytic inner face being spaced in electrically non-conductive contact from said anode, and said cathode substantially completely enclosing said anode to provide a cylinder-like shape, exposed electrical contact means in electrical contact with said anode at one end of said cell and exposed electrical contact means in electrical contact with said cathode at the opposite end of said cell and an electrolyte material between said anode and cathode, said anode and cathode and both said electrical contact means being constructed and arranged to provide an electrolyte-tight seal between said anode, cathode, and electrical contact means, a substantially rigid protective shield having a plurality of perforations therein and being substantially co-extensive with said cathode, and means for spacing said shield from said cathode over substantially the entire surface area of said cathode, said means including spacer means at opposite ends of said cylinder-like cell constructed and arranged with said protective shield to secure said shield to said cell while providing a space over substantially the entire surface area of said cathode permitting access of air to said cathode through said perforations, said anode includes closure means and said closure means and said spacing means are threadedly engaged.

2. The metal/air cell of claim 1 wherein the metallic anode comprises a wire mesh filled with active metal particles.

3. The metal/air cell of claim 1 wherein the metallic anode comprises a plate with a plurality of holes therein.

4. The metal/air cell of claim 1 wherein said electrocatalytic inner face comprises a metal selected from the group consisting of elements of Groups IB and VIII of the Periodic Table and mixtures and alloys thereof, and said cathode includes a porous metallic current collecting element in contact with said electrocatalytic outer face.

5. A metal/air cell according to claim 4 in which the metal of the said electrocatalytic inner face is mixed with a hydrophobic polymer.

6. The metal/air cell of claim 1 wherein the said anode is removable and replaceable.

7. The metal/air cell according to claim 1 wherein the said metal anode is impregnated with an anhydrous electrolyte material.

8. The metal/air cell according to claim 7 wherein said anhydrous electrolyte material is an alkali metal hydroxide.

9. A metal/air cell according to claim 7 wherein a rupturable water reservoir is disposed within the said spacing means.

10. A metal/air cell according to claim 9 wherein the said water reservoir is ruptured by means of a puncturing means.

11. A metal/air cell according to claim 1 wherein the said electrolyte comprises an alkali metal hydroxide.

12. A metal/air cell according to claim 1 wherein the said closure means and the said spacing means comprise a synthetic resin.

13. The metal/air cell of claim 1 including a rupturable electrolyte reservoir, and means for rupturing said reservoir from the outside of said sealed cell.

14. The metal/air cell of claim 1 wherein the electrolyte is anhydrous and impregnates the anode, and the cell incudes a rupturable water reservoir and means for rupturing said reservoir from the outside of said sealed cell.

15. The metal/air cell of claim 1 wherein the hydrophobic polymer is polytetrafluoroethylene.

16. The metal/air cell of claim 15 wherein the electrocatalytic inner face comprises a catalytic material of a metal and a hydrophobic polymer.

17. The metal/air cell of claim 16 wherein the hydrophobic polymer is polytetrafluoroethylene.

18. The metal/air cell of claim 17 wherein the metallic anode is zinc.

* * * * *